Aug. 26, 1930. W. E. McLAUGHLIN 1,774,030
PNEUMATIC SCREW DRIVER
Filed May 13, 1929   4 Sheets-Sheet 3
Fig. 3.
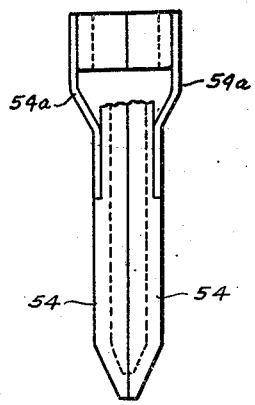
Fig. 4.
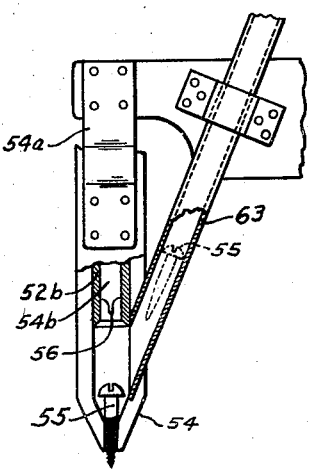
Fig. 5.
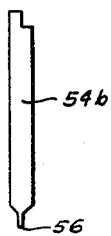
Fig. 6.
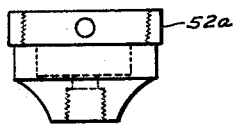
Fig. 7.
Fig. 10.
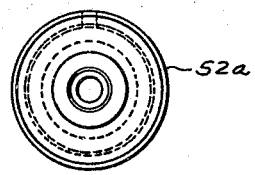
Fig. 8.  Fig. 9.
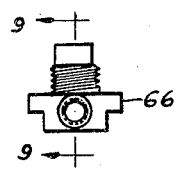 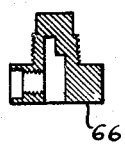
Fig. 11.
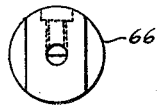
INVENTOR
William E. McLaughlin
BY Toulmin + Toulmin
ATTORNEY Aug. 26, 1930.  W. E. McLAUGHLIN  1,774,030
PNEUMATIC SCREW DRIVER
Filed May 13, 1929   4 Sheets-Sheet 4
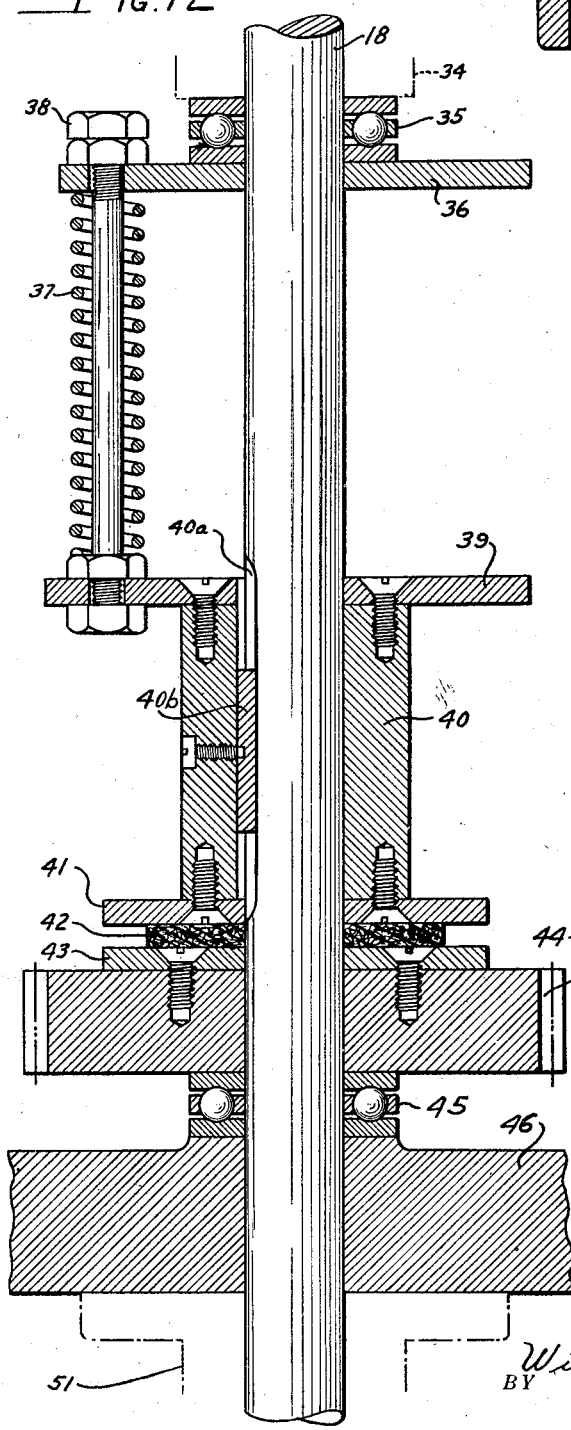
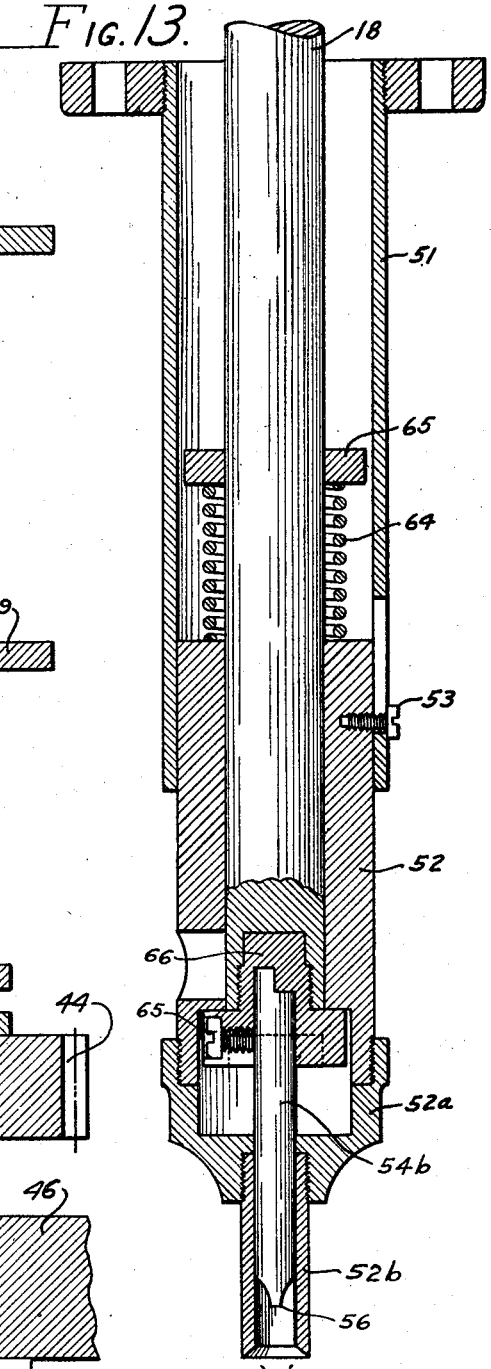
INVENTOR
William E. McLaughlin
BY Toulmin & Toulmin
ATTORNEY Patented Aug. 26, 1930

1,774,030

UNITED STATES PATENT OFFICE

WILLIAM E. McLAUGHLIN, OF MIDDLETOWN, OHIO, ASSIGNOR TO THE BARKELEW ELECTRIC MANUFACTURING COMPANY, OF MIDDLETOWN, OHIO, A CORPORATION OF OHIO

PNEUMATIC SCREW DRIVER

Application filed May 13, 1929. Serial No. 362,604.

My invention relates to screw drivers.

It is the object of my invention to provide a machine for automatically feeding screw drivers to be driven, for yieldingly pressing screws into position and for rotating the screws to drive them into final position under such pressure, all of which operations are automatically performed.

It is a further object to provide a constantly rotating screw driver, pneumatically pressed into position for forcing the screw into the material into which it is driven, and means for accommodating differences in size of screws so as to adjust the holding means for the screw according to the nature thereof until the screw shall have gotten started.

Referring to the drawings:

Figure 3 is a detail side elevation of the screw holding fingers;

Figure 4 is a side elevation partially in section of the magazine screw feed;

Figure 5 is a detail side elevation of the end of the screw driver;

Figure 6 is a detail side elevation of the chuck head used as the thrust bearing;
Figure 7 is an end view of the screw driver;

Figure 8 is a side elevation of the shank;

Figure 9 is a section through the shank on the line 9—9 of Figure 8;
Figure 10 is a plan view of the thrust bearing;

Figure 11 is an end elevation of the shank;

Figure 12 is a section taken vertically through the clutch and driving mechanism;

Figure 1:
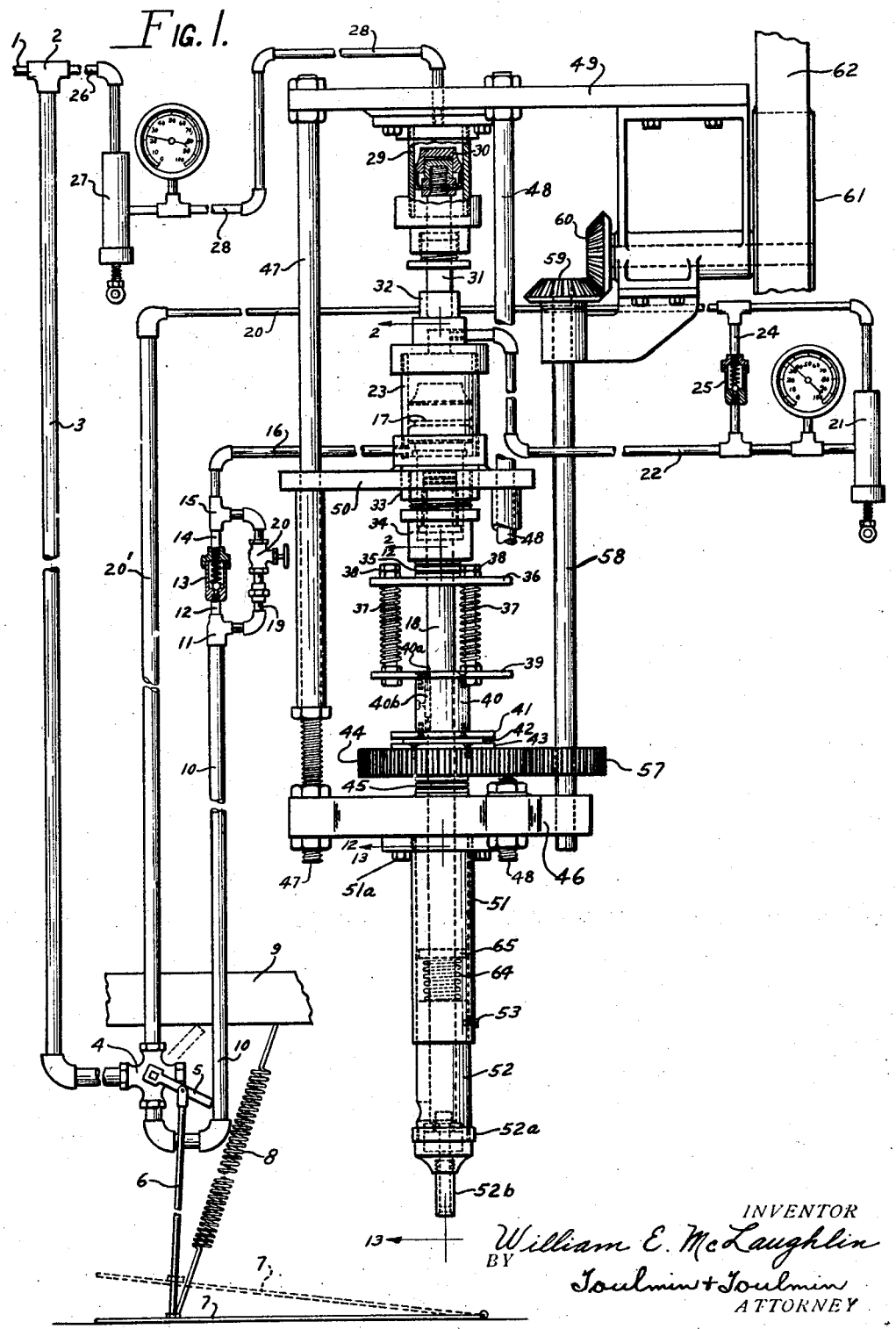
Figure 1 is a side elevation of the complete apparatus of my invention;
Figure 2:
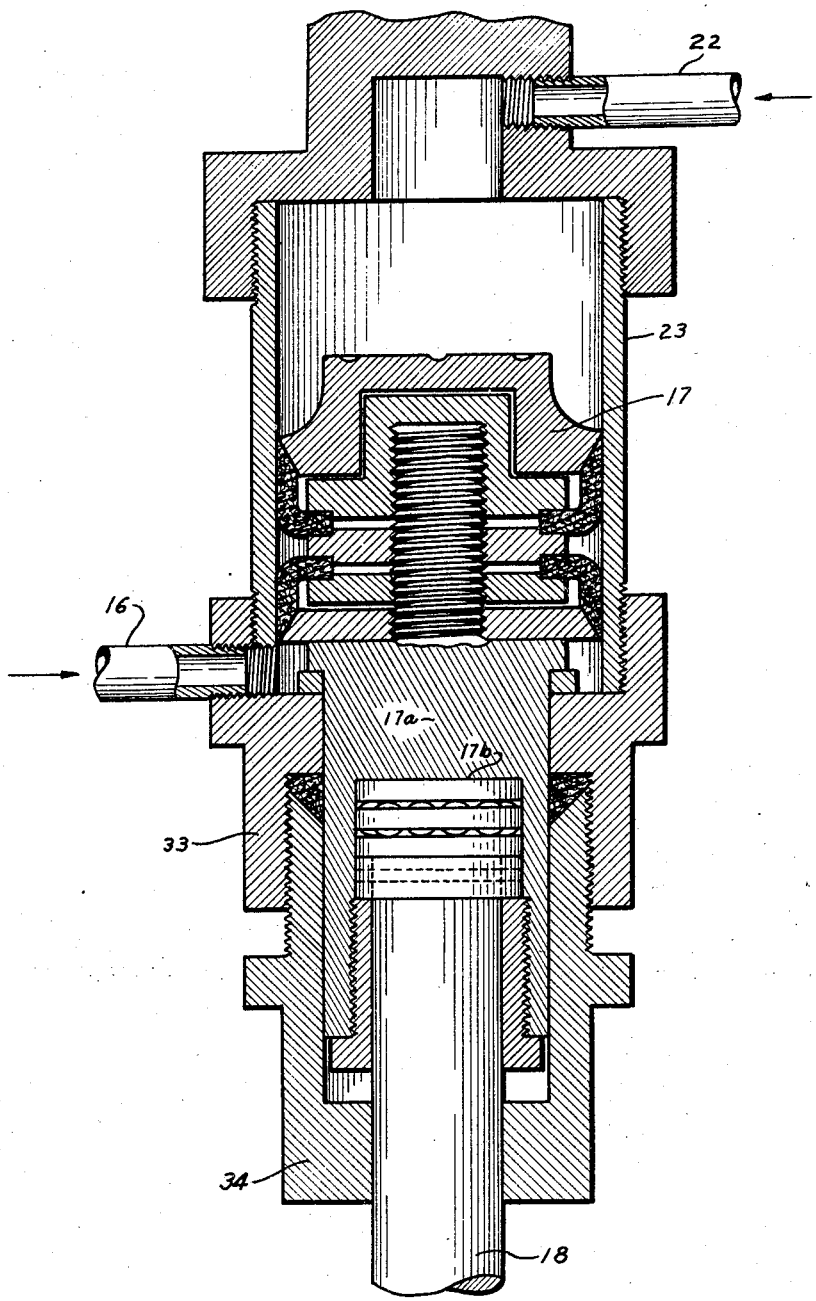
Figure 2 is a vertical section through the screw driver, piston and cylinder.

Figure 13 is a section through the connection between the clutch, piston rod and the raising and lowering cylinder for the screw driver.
Referring to the drawings in detail, 1 is an air supply line. The line 2 supplies air through the line 3 to the control valve 4 which is controlled by the handle 5, the connecting rod 6 and the foot treadle 7. The spring 8 is attached to the foot treadle at one end and to a support 9 at the other end. This spring resists the movement of the foot treadle.

Leading from the valve 4 is an air supply pipe 10, which communicates with a T 11. From one side of this T projects a pipe 12 communicating with a ball check valve 13. The other side of the ball check valve is connected by the pipe 14 to a T 15. This T 15 is in turn connected to the pipe 16 that supplies air to the under side of the pneumatic piston 17, which controls a downward and upward movement of the screw driver shaft 18.

This T 11 is provided with a by-pass line 19 controlled by the valve 20 for regulating the flow of air around the check valve 13.

The pipe 20' leading from the master valve 4 passes through a regulator 21 to the pipe 22 which communicates with the top of the cylinder 23 in which works the screw driver piston 17.

The lines 20 and 22 are interconnected by an exhaust pipe 24 in which is interposed a check valve 25 which permits of the relief directly of the exhaust air from the upper end of the cylinder 23 without going through the regulator 21. The pipe 26, which is connected to the T 2, passes through a regulator 27 and thence the air passes to a pipe 28 which enters the upper end of the cylinder 29 over the piston 30. This piston carries the piston rod 31 which is mounted within the cup 32 and serves to force the cylinder 23, pipe 20, pipe 24, sleeve 33 and sleeve 34 with ball bearing 35 downwardly against the plate 36. This plate is supported on the springs 37 and bolts 38 from the plate 39 that is, in turn, supported upon the sleeve 40 that surrounds the screw driver 18 and is splined to it by the spline 40ª and key 40ᵇ. This sets up a friction between the shoulder 41, the clutch plate 42 of fiber and the shoulder 43 carried on the gear 44.

The gear 44 is supported on the ball bearings 45 which rest upon the cross frame member 46 that is suitably supported by the rods 47 and 48 from the stationary frame 49. 50 indicates another cross frame member mounted on the rods 47 and 48. A sleeve 51 is carried on the cross frame member 46 by the bolts 51ª. The sleeve 52 is connected by the set screw 53 to the sleeve 51. On this sleeve 52 is mounted a thrust bearing 52ª by means of springs or brackets 54ª. The fingers 54 are part of an attachment shown in Figure 4 adapted to be inserted or attached to the lower part of the sleeve 51 by means of springs or brackets 54ª. Attached to these same brackets is a magazine 63 for containing and guiding screws into the lower parts of the fingers 54. Within this thrust bearing 52ª is the screw driver bit 54ᵇ.

The gear 44 turns loosely on the shaft 18. The bit 54ᵇ is provided with a screw driver head 56 which engages the screw 55.

The gear 44 is driven by the gear 57 from the shaft 58 that, in turn, is driven by the bevel gears 59 and 60 from any suitable source of power 61 by the belt 62.

The screw feeding mechanism is controlled by the position of the screw driver. When the screw driver is withdrawn from the sleeve 52 the screw at the bottom of the column in the storage line 63 is allowed to drop into position between the spring held fingers 54. It is then in position to be pressed downwardly and outwardly between the spring fingers by the screw driver 56. I prefer to build these spring fingers with a pair of stiff holding members such as indicated mounted on springs 54ª.

The downward movement of the screw driver is resisted by the spring 64 which rests against the collar 65 at one end and on the upper end of the sleeve 52 at the other.

Method of operation

Assuming a given supply of air is entering through the pipe 1 and a screw is in position as shown in Figure 4 by depressing the treadle 7, the valve 4 is moved to a position shown in full lines in Figure 1 which opens the line 20 and closes the line 10. Pressure then enters the upper end of the cylinder 23 forcing the screw driver piston 17 downwardly. The piston 17 rests upon a bronze sleeve 17ª which, in turn, rests upon a ball bearing 17ᵇ on top of the piston rod 18. This moves the screw driver downwardly.

The screw driver is already being rotated through the gears 57 and 44. The downward movement of the screw driver with the screw forces the screw into the work from between the fingers 54 and against the resistance of the spring 54ª on these fingers.

When the treadle 7 is lifted under the influence of the spring 8, the valve 4 is shifted so that the line 20 is closed and the line 10 is opened, thus placing air beneath the piston 17, lifting the screw driver. When this happens, the screw in the magazine 63 next in line is allowed to drop into position between the jaws 54.

It will be understood that I desire to comprehend within my invention such modifications as may be necessary to adapt it to varying conditions and uses.

Having thus fully described my invention, what I claim as new and desire to secure by Letters Patent, is:

1. In combination, a screw driver, a driving means mounted loosely thereon, a piston on said screw driver, a cylinder, means for raising and lowering the screw driver pneumatically by applying pressure to either side of said piston, a clutch for connecting said screw driver to said driving means, said clutch being connected to said cylinder, a second stationary cylinder, a piston and piston rod therein connected to the first cylinder whereby the movement of the first cylinder will cause said clutch to engage with the driving means to rotate the screw driver.

2. In combination, a screw driver, a driving means mounted loosely thereon, a piston on said screw driver, a cylinder, means for raising and lowering the screw driver pneumatically by applying pressure to either side of said piston, a clutch for connecting said screw driver to said driving means, said clutch being connected to said cylinder, a second stationary cylinder, a piston and piston rod therein connected to the first cylinder whereby the movement of the first cylinder will cause said clutch to engage with the driving means to rotate the screw driver, and a thrust bearing between said clutch and said first mentioned cylinder.

3. In combination, a screw driver, a driving means mounted loosely thereon, a piston on said screw driver, a cylinder, means for raising and lowering the screw driver pneumatically by applying pressure to either side of said piston, a clutch for connecting said screw driver to said driving means, said clutch being connected to said cylinder, a second stationary cylinder, a piston and piston rod therein connected to the first cylinder whereby the movement of the first cylinder will cause said clutch to engage with the driving means to rotate the screw driver, and yielding means between said clutch and said first mentioned cylinder.

4. In combination, a stationary frame, a stationary cylinder mounted thereon, means for applying pressure to one end of said cylinder, a piston and piston rod therein, a second cylinder adapted to move with respect to said frame and first cylinder, the end of the second cylinder engaged by the piston rod in the first cylinder, a piston and piston rod in the second cylinder, said piston rod comprising a screw driver, means of applying pressure to either side of said cylinder for raising and lowering the screw driver, a clutch splined to said screw driver movable laterally thereby and therewith, a driving means carried by said frame adapted to be engaged by said clutch, whereby pressure in the first mentioned cylinder will cause said clutch to engage to drive the screw driver.

5. In combination a stationary frame, a stationary cylinder mounted thereon, means for applying pressure to one end of said cylinder, a piston and piston rod therein, a second cylinder adapted to move with respect to said frame and first cylinder, the end of the second cylinder engaged by the piston rod in the first cylinder, a piston and piston rod in the second cylinder, said piston rod comprising a screw driver, means of applying pressure to either side of said cylinder for raising and lowering the screw driver, a clutch splined to said screw driver movable laterally thereby and therewith, a driving means carried by said frame adapted to be engaged by said clutch, whereby pressure in the first mentioned cylinder will cause said clutch to engage to drive the screw driver, yielding means to resist the movement of said clutch and thrust bearings between said yielding means on one side and the clutch and between said driving means and the stationary frame on the other.

6. In combination, a stationary frame, a stationary cylinder mounted thereon, means for applying pressure to one end of said cylinder, a piston and piston rod therein, a second cylinder adapted to move with respect to said frame and first cylinder, the end of the second cylinder engaged by the piston rod in the first cylinder, a piston and piston rod in the second cylinder, said piston rod comprising a screw driver, means of applying pressure to either side of said cylinder for raising and lowering the screw driver, a clutch splined to said screw driver movable laterally thereby and therewith, a driving means carried by said frame adapted to be engaged by said clutch, whereby pressure in the first mentioned cylinder will cause said clutch to engage to drive the screw driver, yielding means to resist the movement of said clutch and thrust bearings between said yielding means on one side and the clutch and between said driving means and the stationary frame on the other, and yielding means to resist the vertical movement of the screw driver, a guide sleeve carried by said frame for guiding said screw driver and supporting said yielding means.

In testimony whereof, I affix my signature.

WILLIAM E. McLAUGHLIN.